Aug. 23, 1932.  A. M. MANNICK  1,873,654
AUTOMATIC CAMERA
Filed Nov. 24, 1931  3 Sheets-Sheet 1
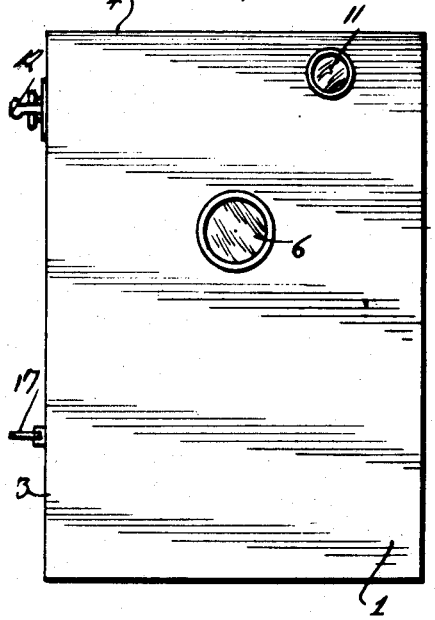
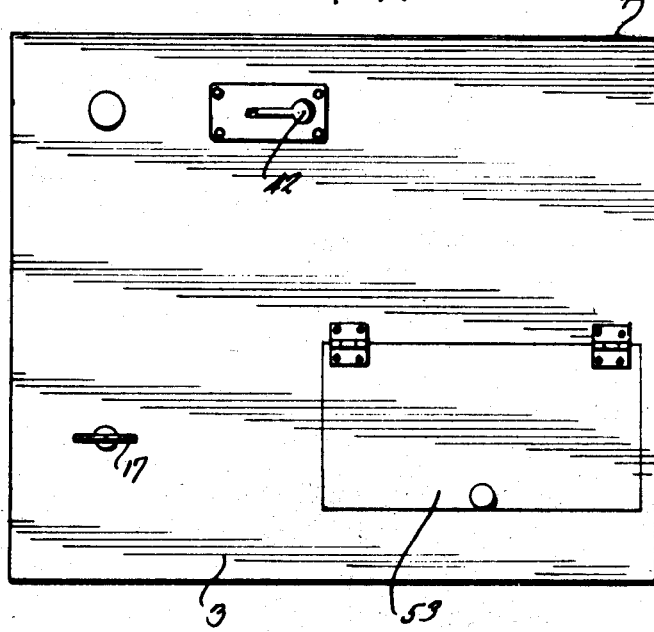
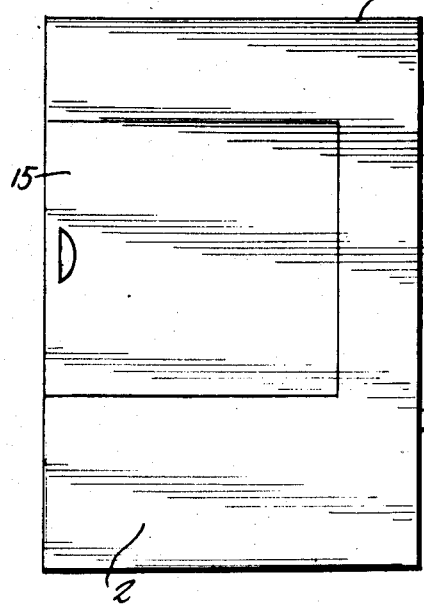
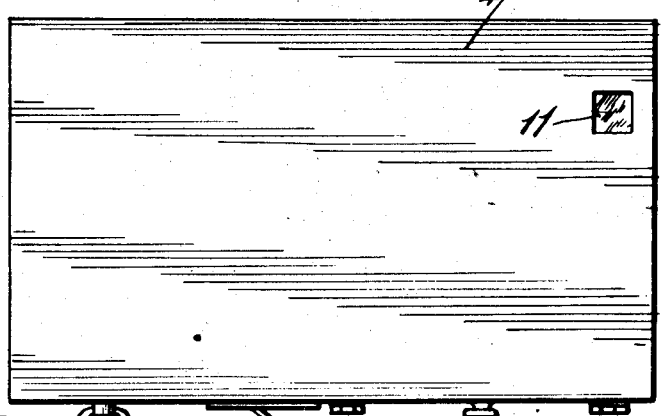
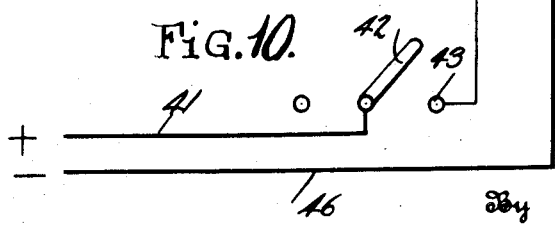
Inventor
Andrew M. Mannick
By Bryant & Lowry
Attorneys Aug. 23, 1932.  A. M. MANNICK  1,873,654
AUTOMATIC CAMERA
Filed Nov. 24, 1931   3 Sheets-Sheet 2

Inventor
Andrew M. Mannick
By Bryant & Lowry
Attorneys

Aug. 23, 1932.   A. M. MANNICK   1,873,654
AUTOMATIC CAMERA
Filed Nov. 24, 1931   3 Sheets-Sheet 3
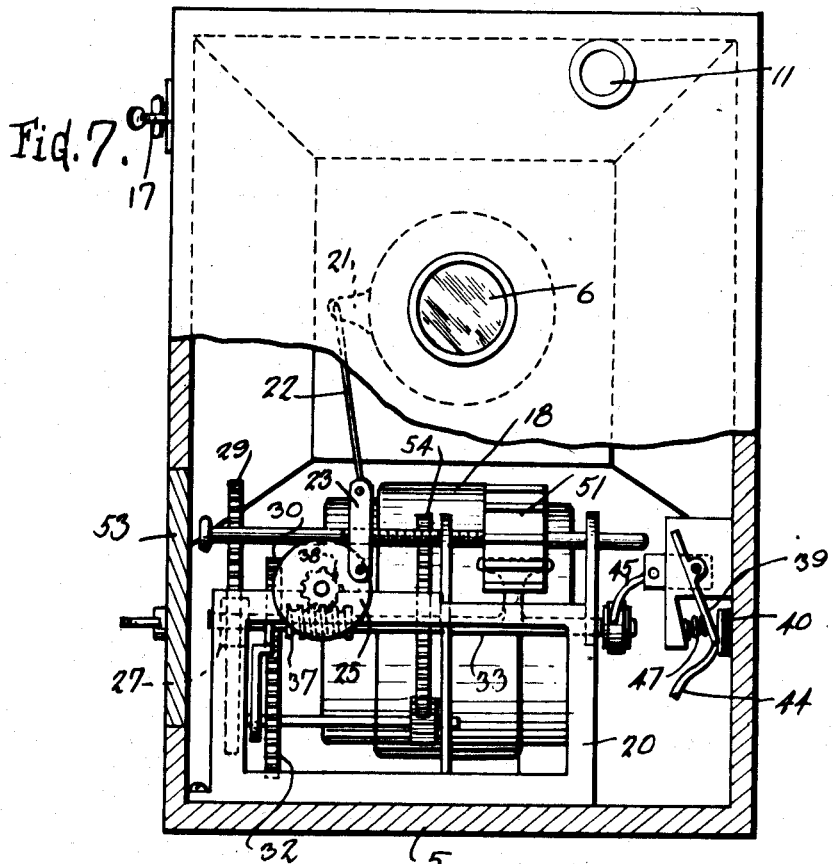
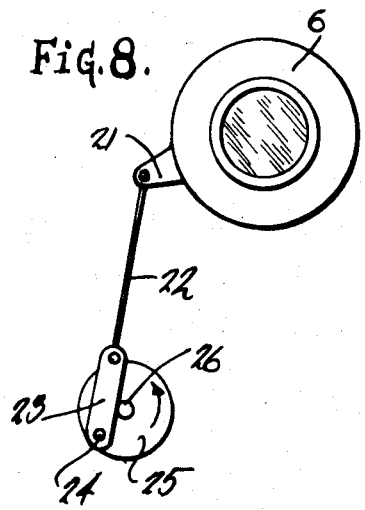
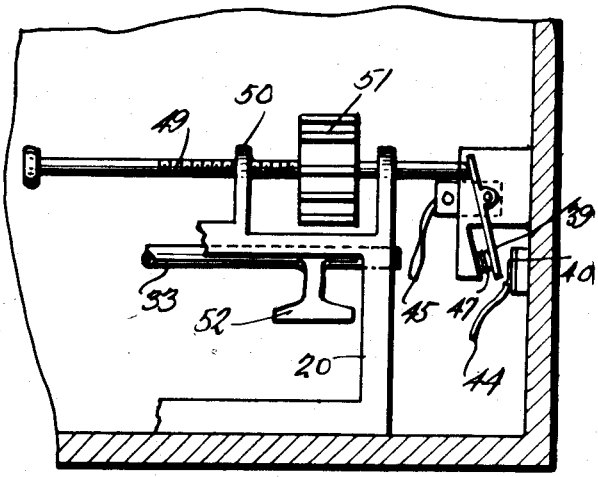
Andrew M. Mannick, Inventor
By Bryant & Lowry
Attorneys Patented Aug. 23, 1932

1,873,654

UNITED STATES PATENT OFFICE

ANDREW M. MANNICK, OF HAZLETON, PENNSYLVANIA

AUTOMATIC CAMERA

Application filed November 24, 1931. Serial No. 577,133.

This invention relates to certain new and useful improvements in automatic cameras.

The primary object of the invention is to provide an automatic camera embodying motor mechanism for the automatic operation of the camera apparatus for the taking of a picture, the switch mechanism for controlling operation of the motor being attached either directly to the camera case or remotely positioned relative to the camera, such as in the window or door opening of a bank or the like for photographing a person and unauthorized entry into a bank building or the like.

With the above and other objects in view that will become apparent as the nature of the invention is better understood, the same consists in the novel form, combination and arrangement of parts hereinafter more fully described, shown in the accompanying drawings and claims.

In the accompanying drawings:—

Figure 1 is a front elevational view of an automatic camera constructed in accordance with the present invention;

Figure 2 is a side elevational view showing a door opening in the camera casing permitting access to the camera mechanism;

Figure 3 is a rear elevational view showing a door opening permitting insertion of the film reel;

Figure 4 is a top plan view;

Figure 7 is an enlarged front elevational view, partly broken away and shown in section;

Figure 8 is a detail elevational view showing the camera lens casing and the operating lever for the camera shutter operatively engaged with the gear train;

Figure 9 is an enlarged detail sectional view showing the automatic switch in open position for shutting off the motor; and Figure 10 diagrammatically illustrates the motor and control switch therefor with the wiring arrangement.

Figures 5, 6:
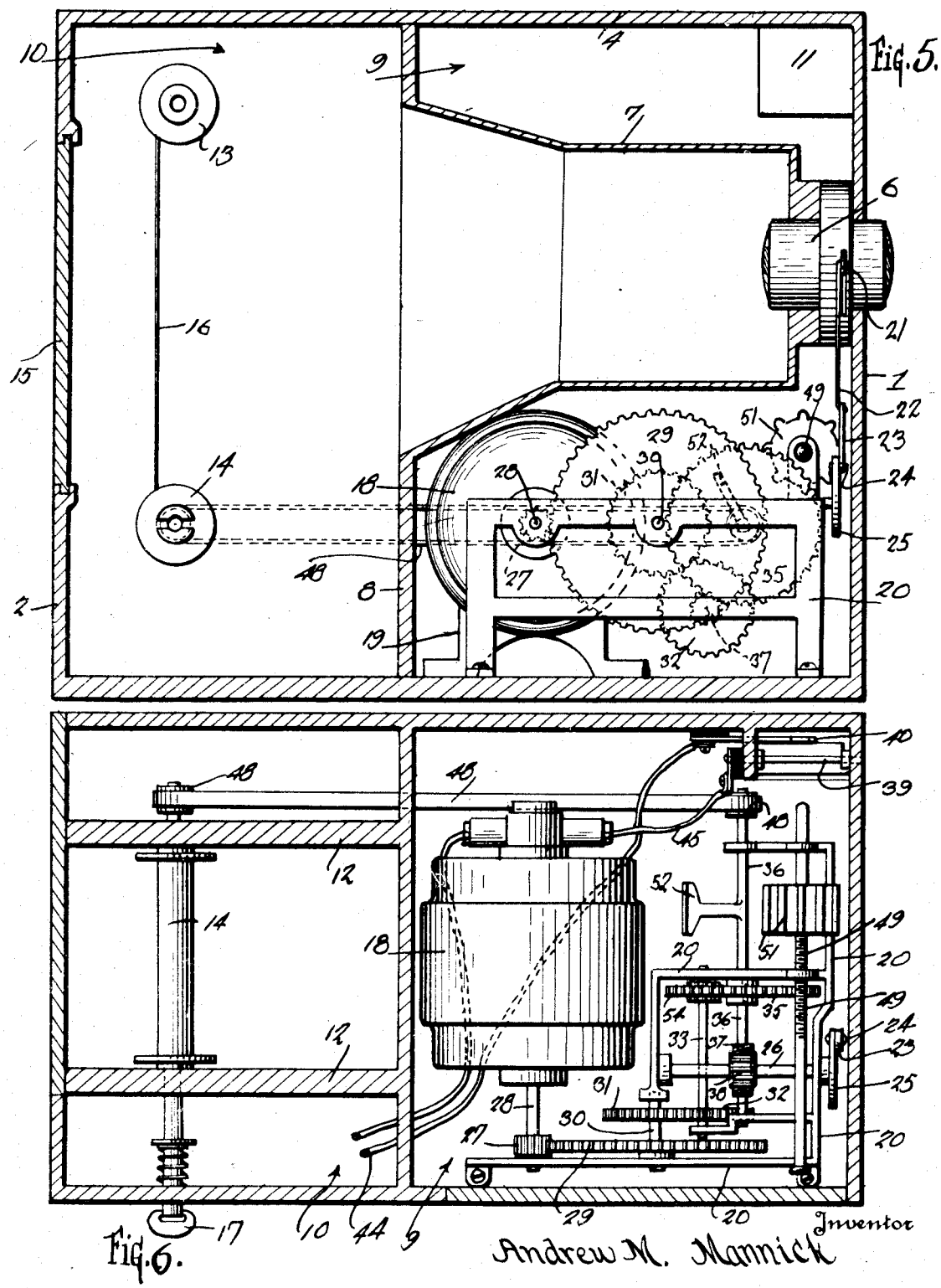
Figure 5 is a vertical longitudinal sectional view showing the motor drive for the gear train that is in communication with the camera shutter.
Figure 6 is a horizontal sectional view showing the devices for controlling operation of the motor.

Referring more in detail to the accompanying drawings, there is illustrated a camera casing having a front wall 1, a rear wall 2, side walls 3, a top wall 4 and a bottom wall 5, the casing being illustrated as of rectangular form. A camera lens box 6, containing shutter mechanism mounted in the front wall 1 of the casing and is in communication with the internal hood 7 that opens through the cross-partition 8 in the casing, the partition defining front and rear compartments 9 and 10 as shown in Figure 5. A sight or object focusing device 11 is associated with the front wall 1 and top wall 4 as illustrated.

The rear compartment 10 has partitions 12 therein for the support of film reels 13 and 14, access to the compartment 10 for the positioning of the film reels being gained by the sliding door 15 shown in Figures 3 and 5. The film strip 16 between the reels 13 and 14 faces the hood 7 and is in line with the lens and shutter mechanism 6. The usual winding key 17 is associated with the film reel 14.

The operating mechanism for the camera shutter is located in the compartment 9 and includes an electric motor 18 set upon a base support 19 including a frame structure 20 as shown in Figures 5 to 7. The camera shutter comprises an operating lever 21 that has a link connection 22 with an operating arm 23 that is pivotally mounted as at 24 upon a disk 25 as shown in Figure 8, the disk 25 being fixed to the shaft 26 journalled in bearings on the frame 20 as shown in Figure 6.

The operating mechanism for the disk 25 includes a gear train beginning with a pinion 27 upon the shaft 28 of the motor 18, the gear train being supported upon the train 20, the pinion 27 having meshing engagement with the gear 29 upon the shaft 30. A gear 31 fixed to the shaft 30 is in meshing engagement with a gear 32 carried by the shaft 33, the shaft 33 carrying a second gear 34 that is in meshing engagement with a gear 35 upon the shaft 36. The worm 37 carried by the shaft 36 is in meshing engagement with the worm wheel 38 fixed to the shaft 26 upon which the disk 25 is mounted so that when the gear train is in operation, rotation is imparted to the disk 25 for the operation of the camera shutter lever 21.

A pair of electric contacts 39 and 40 is supported within the compartment 9 of the camera casing and these contacts are in circuit with the electric motor 18, the lead-in wire 41 as illustrated in Figure 10 from a source of potential having a manually controlled switch 42 set therein, illustrated in Figure 2 as being carried by the camera casing, but it is to be understood that this switch 42 may be positioned elsewhere, such as in a window or door opening for automatic operation, the switch 42 being engageable with the contact 43 that has the wire 44 attached to the contact 40. The wire 45 from the contact 39 leads to the motor 18 and extends therefrom as at 46 to the negative side of the source of potential.

When the camera is in set position for taking a picture, the contacts 39 and 40 are engaged with each other as illustrated in Figure 7, the contact 39 comprising a pivoted lever tensioned as at 47. When the switch 42 is closed, and the contacts 39 and 40 engaged with each other, circuit through the motor 18 is closed and operation of the motor is communicated to the train of gearing to the shaft 26 and disk 25 for the operation of the camera shutter, the disk 25 travelling through one complete revolution and brought to rest by devices for separating the contact 39 from the contact 40 whereupon the circuit through the electric motor 18 is broken. During operation of the motor 18, the shaft 36 rotates and this shaft has a belt and pulley connection 48 with the film reel 14 for bringing a new section of the film strip 16 into exposure position relative to the camera lens and shutter.

The devices for separating the contact 39 from the contact 40 include a screw shaft 49 shown in Figures 6, 7 and 9 that thread through a bracket arm 50 upon the frame 20, the screw shaft 49 carrying a gear block 51 that is engaged by the radial arm 52 carried by the shaft 36, the rotation of the gear block 51 causing the screw shaft 49 to thread through the bracket bearing 50 with the forward projecting end of the screw shaft engaging the contact 39 to separate the same from the contact 40, engaged positions of the contacts 39 and 40 with the spaced screw shaft 49 being illustrated in Figure 7, while the separated positions of the contacts 39 and 40 with the contact 39 shifted by the screw shaft 49 being illustrated in Figure 9. The separation of the contacts 39 and 40 breaks the flow of current through the electric motor 18 and brings the same to rest. As shown in Figure 2, a side door opening 53 permits access to the compartment 9 of the camera casing so that the screw shaft 49 may be manually shifted from the position shown in Figure 9 to that shown in Figure 7, thus, it being understood that the switch 42 is moved to open position before the screw shaft 49 is shifted.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:—

1. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, and means operated by the gear train for separating the contacts to render the motor inoperative.

2. In an automatic camera of the character described, a casing, a lens and shutter mechanism, an electric motor in the casing, a gear train operated by the motor, operative connections between the gear train and shutter mechanism, film reels in the casing with the film strip passing the lens and shutter mechanism, and operative connections between one of said reels and the gear train for automatically moving the film strip into exposure position.

3. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, means operated by the gear train for separating the contacts to render the motor inoperative, film reels in the casing with the film strip passing the lens and shutter mechanism, and operative connections between one of said reels and the gear train for automatically moving the film strip into exposure position.

4. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, means operated by the gear train for separating the contacts to render the motor inoperative, said means including a screw shaft normally spaced from the contacts, a gear block on the screw shaft, and an arm for rotating the gear block for moving the screw shaft in a step-by-step movement.

5. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, means operated by the gear train for separating the contacts to render the motor inoperative, film reels in the casing with the film strip passing the lens and shutter mechanism, operative connections between one of said reels and the gear train for automatically moving the film strip into exposure position, said means including a screw shaft normally spaced from the contacts, a gear block on the screw shaft, and an arm for rotating the gear block for moving the screw shaft in a step-by-step movement.

6. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, means operated by the gear train for separating the contacts to render the motor inoperative, said means including a screw shaft normally spaced from the contacts, a gear block on the screw shaft, an arm for rotating the gear block for moving the screw shaft in a step-by-step movement, and said screw shaft being manually shifted to a position spaced from the contacts.

7. In an automatic camera of the character described, a casing, a lens and shutter mechanism, an electric motor in the casing, a gear train operated by the motor, operative connections between the gear train and shutter mechanism, a pair of contacts in circuit with the motor normally engaged with each other, means operated by the gear train for separating the contacts to render the motor inoperative, film reels in the casing with the film strip passing the lens and shutter mechanism, operative connections between one of said reels and the gear train for automatically moving the film strip into expossure position, said means including a screw shaft normally spaced from the contacts, a gear block on the screw shaft, an arm for rotating the gear block for moving the screw shaft in a step-by-step movement, and said screw shaft being manually shifted to a position spaced from the contacts.

In testimony whereof I affix my signature.

ANDREW M. MANNICK.